Nov. 6, 1956     I. H. PAGE     2,769,902
RECEIVER FOR PULSE SIGNALING SYSTEM
Filed Oct. 11, 1945     3 Sheets-Sheet 1
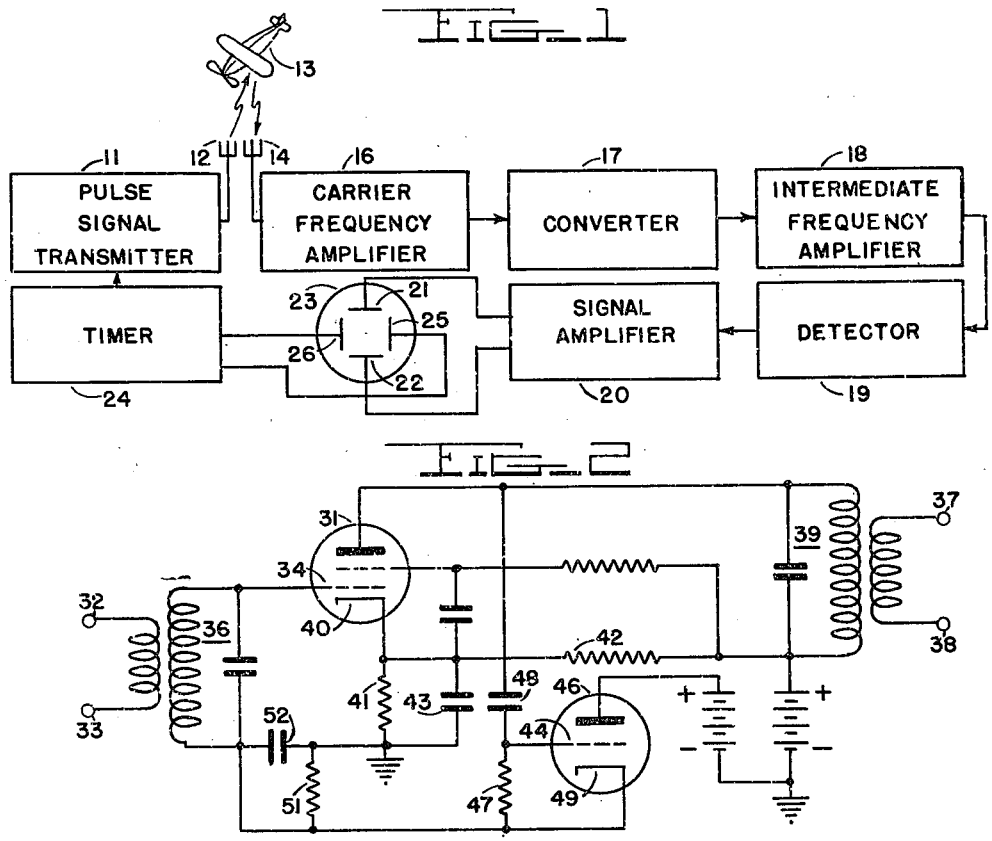
Inventor
IRVING H. PAGE
Attorney Inventor
IRVING H. PAGE Attorney

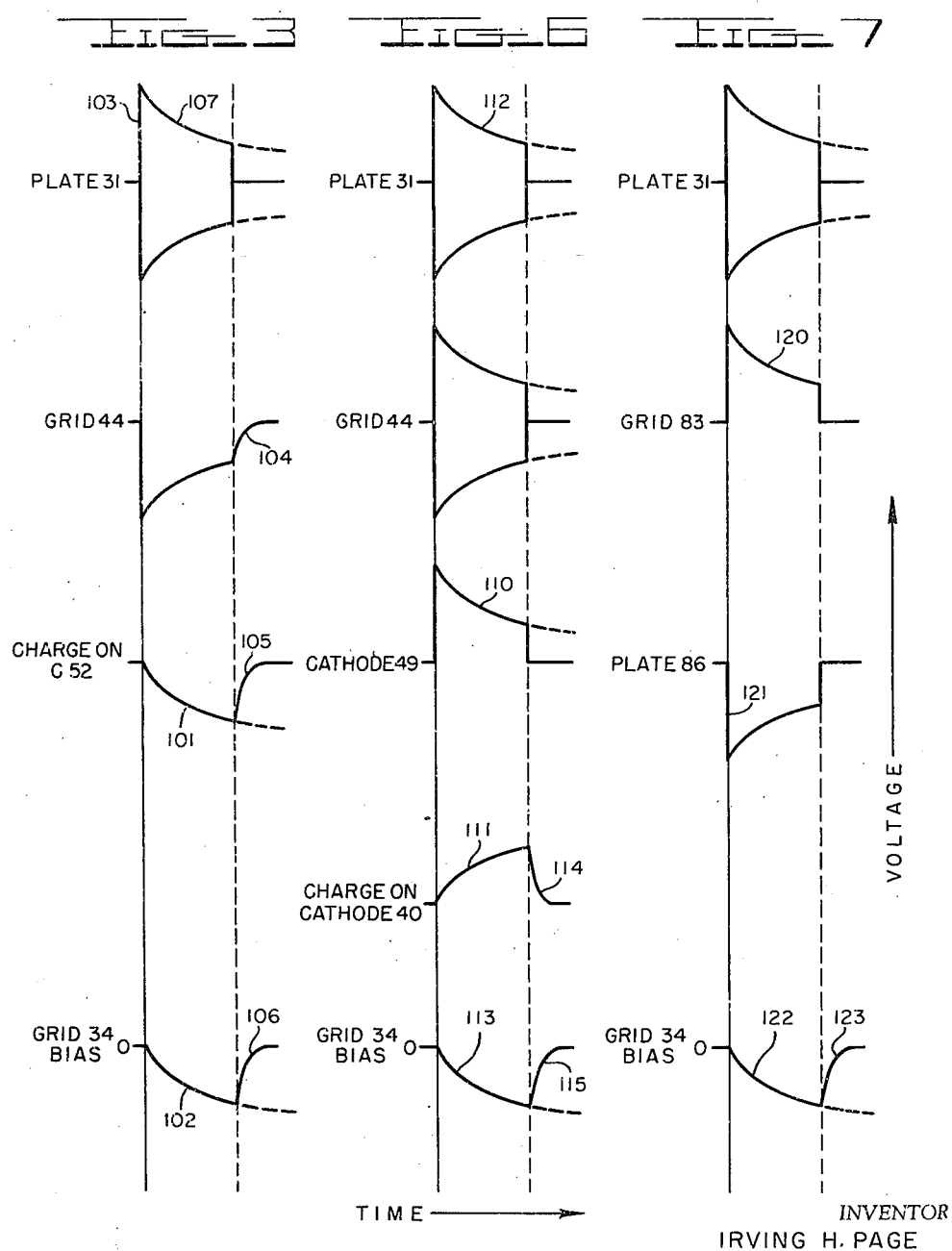

United States Patent Office 2,769,902
Patented Nov. 6, 1956

2,769,902

RECEIVER FOR PULSE SIGNALING SYSTEM

Irving H. Page, Washington, D. C.

Application October 11, 1945, Serial No. 621,670

5 Claims. (Cl. 250—20)

(Granted under Title 35, U. S. Code (1952), sec. 266)

This invention relates to pulse signaling systems, more particularly to echo ranging systems, and is directed to method and means for maintaining receivers in such systems operative in the presence of interfering signals.

Many pulse signaling systems operate to determine the time interval between a pair of pulse signals. In particular, echo ranging systems operate to transmit pulse signals comprising a series of short wave trains and to receive the energy of the wave trains reflected from remote objects. Means are provided in such systems for indicating the elapsed time between the transmission of a wave train and the reception of an echo signal due to the wave train reflected from a remote object. From a knowledge of the velocity of propagation of the wave train through the intervening medium the range of the remote object may be determined.

Thus, the range of a remote object is indicated by the elapsed time between the initiation of transmission of a wave train and the initiation of reception of the same wave train reflected from a remote object. Consequently, the initial portion of the received wave train conveys the required intelligence indicating the range of the remote object and the remainder of the wave train makes no further contribution to this intelligence. Other pulse signaling systems operate in accordance with modulation of the pulse spacing or of the pulse repetition rate.

Accordingly, an object of the invention is to provide in a pulse signaling system means receptive to the initial portions only of received wave trains.

It is contemplated that interfering signals may be received by a pulse signaling system together with the desired pulse signals. It is further contemplated that the interfering signals may comprise either continuous waves or wave trains of short duration.

It is, therefore, another object of the invention to provide in a pulse signaling system means for reducing detrimental effects due to interfering signals.

A further object of the invention is to provide in an echo ranging system means for maintaining substantially constant the sensitivity of the system to echo signals received concurrently with interfering signals.

The invention provides in an echo ranging system having a receiver including amplifier means for received signals, detector means responsive to the amplitude of received signals for applying to one or more amplifier stages a degenerative bias of sufficient magnitude to maintain substantially constant the sensitivity of the receiver to increments of signal amplitude. The means for applying the degenerative bias may comprise either a separate detector or rectification means in an amplifier.

The invention may be understood more completely by reference to the following description and to the accompanying drawings in which:

Fig. 1 is a diagram of an echo ranging system in which the invention may be incorporated, and Figs. 2, 4, and 5 are schematic diagrams of exemplary embodiments of the invention.

Figs. 3, 6 and 7 are diagrammatic representations of the voltage waveform in various portions of the circuit, plotted against time as the abscissa.

Figure 4:
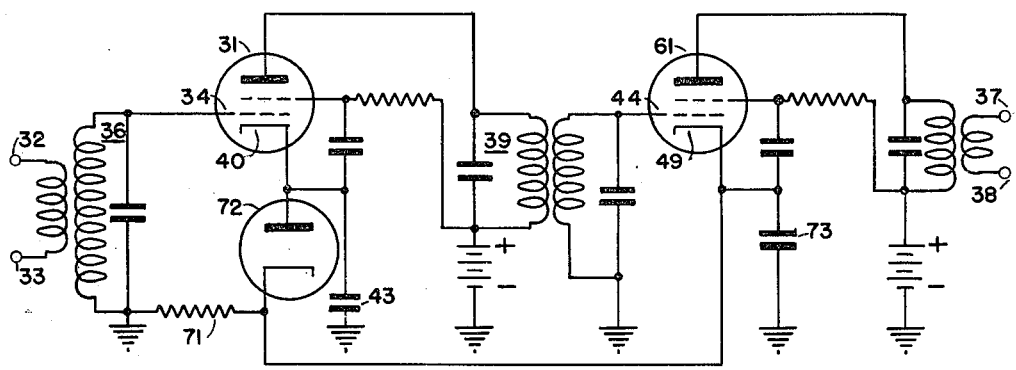

Referring now to Fig. 1, there is shown, in elementary form, an echo ranging system. The pulse signal transmitter 11 generates a series of signals comprising short wave trains and delivers the signals to a radiating element, denoted by antenna 12, from which the signals propagate with known velocity. When the signals impinge upon a remote object, denoted by the airplane 13, a portion of the energy of the signals is reflected and a portion of the reflected energy is intercepted by the receiving antenna 14 will be referred to hereinafter as the echo signal. The echo signal may be amplified by a carrier frequency amplifier 16, transformed through a converter 17 to an intermediate frequency, and further amplified by an intermediate frequency amplifier 18. The amplified echo signal is then delivered to detector 19 which produces a unidirectional voltage output in accordance with the envelope of the echo signal. The detector output voltage may be further amplified by signal amplifier 20 and applied to one coordinate of an indicator, such as the vertical deflection plates 21, 22 of a cathode ray tube 23. A timer 24 operates to initiate a time base signal simultaneously with the transmission of a pulse signal by transmitter 11. The time base signal is applied to another coordinate of the indicator, such as the horizontal deflecting plates 25, 26 of the cathode ray tube 23. The echo signal thus produces a vertical deflection of the trace on the screen of cathode ray tube 23 at a horizontal position which indicates the elapsed time between the transmission and reception of the echo signal. Thus, the range of the remote object is indicated by the position of the echo signal on the screen. For accurate measurement of range, the position of the initial portion of the echo signal is carefully noted.

An echo ranging system as shown in Fig. 1 may be subjected to interference from continuous wave signals. In order to prevent strong interfering signals from overloading the receiver and thereby blocking reception of relatively weak echo signals, the invention provides means for progressively reducing the amplification of a received signal subsequent to the initial portion of the signal, while maintaining substantially constant the sensitivity of the receiver to positive increments of received signal amplitude.

Fig. 2 is a schematic diagram of an amplifier according to the invention, which may be incorporated in either the carrier frequency amplifier 16 or the intermediate frequency amplifier 18. The amplifier comprises an amplifier tube 31 which is energized by signals applied to the input terminals 32, 33 and coupled to the control grid 34 through an impedance which may comprise a resonant circuit 36 tuned to the frequency of the signals. The amplified signal output of tube 31 is applied to the output terminals 37, 38 through a plate load impedance which may comprise a resonant circuit 39 tuned to the frequency of the signals. The cathode 40 of tube 31 is maintained at a substantially constant positive bias potential by means of a voltage divider comprising resistors 41, 42 and cathode by-pass condenser 43. The output circuit of amplifier tube 31 is coupled to the control grid 44 of detector tube 46 through a grid leak resistor 47 and a grid condenser 48. The cathode 49 of the detector tube 46 is returned to ground through a load impedance comprising a resistor 51 and a condenser 52, which also constitutes a portion of the grid return circuit amplifier tube 31. Thus, the potential of the control grid 34 of amplifier tube 31 is determined by the amount of space current flowing through detector tube 46.

In the absence of input signals a steady negative bias is applied to the control grid 34 of the amplifier tube 31 equal to the difference between the voltage drops across resistors 41 and 51. The zero-signal bias potential of control grid 34 is of the proper magnitude to cause tube 31 to operate as a class A amplifier and thereby provide substantially its maximum gain.

The time constant of the grid leak resistor 47 and the grid condenser 48 is preferably of the order of, or less than, one-tenth of the time duration of the desired pulse signals. Thus, as shown in Fig. 3, a discrete pulse signal applied to the input terminals 32, 33 and amplified by tube 31 is applied to the control grid 44 of detector tube 46 and quickly develops a negative bias potential across grid leak 47. The space current through tube 46 decreases due to the negative grid bias. The voltage 101 across resistor 51 then decreases exponentially at a rate determined by the time constant of condenser 52 and a resistance substantially equal to the parallel resistance of resistor 51 and the static plate resistance of detector tube 46, the latter being relatively high due to the negative bias potential of grid 44. As condenser 52 discharges, the negative bias potential 102 of grid 34 increases and thereby reduces the gain of the tube 31. However, the time constant of discharge of condenser 52 is made sufficiently long to enable the initial portion 103 of the pulse signal to be amplified with practically no loss of gain, and is preferably of the order of ten times the time constant of resistor 47 and condenser 48.

At the termination of the pulse signal, the grid 44 quickly returns, as at 104, to zero potential, causing the static plate resistance of detector tube 46 to decrease to a low value. Condenser 52 is then charged quickly, as at 105 by the space current of detector tube 46, thus returning, as at 106, the control grid 34 of amplifier tube 31 to the normal quiescent potential.

It will be understood that the incremental bias progressively applied to amplifier tube 31 by detector tube 46 in response to a signal produces a degenerative effect on the gain of the amplifier as shown by decreasing amplitude of signal envelope 107. The magnitude of this degenerative bias voltage is determined by the amount of D. C. amplification provided by detector tube 46.

It will now be assumed that an interfering signal is received concurrently with the desired pulse signal, and that the interfering signal is an unmodulated continuous wave. The interfering continuous wave signal causes the detector tube 46 to apply a negative incremental bias potential to the control grid 34 of amplifier tube 31. The incremental bias is preferably made substantially equal to the amplitude of the interfering continuous wave.

The desired pulse signals constitute positive increments of amplitude of the composite signal applied to the control grid 34. Due to the fact that the negative bias potential of control grid 34 is increased by an amount substantially equal to the amplitude of the interfering continuous wave signal, the positive increments of amplitude due to the desired signal appear at substantially the same portion of the dynamic operating characteristic curve of tube 31 as when no interfering signal is present. Consequently, the gain of the amplifier to the desired signal is maintained substantially the same as when no interfering signal is received.

The invention also functions to suppress other types of interfering signals. For example, the positive increments only of interrupted continuous wave interfering signals are amplified, thereby preventing such signals from overdriving the amplifier except during the initial portions of the signals.

Interfering signals which are amplitude modulated by waves having periods substantially longer than the time constant of discharge of condenser 52 are suppressed due to the fact that the charge on condenser 52 may change rapidly enough to compensate for the amplitude variations of the interfering signals.

Frequency modulated interfering signals are suppressed when the band width of the input circuit 36 is greater than the band width of the interfering signals in the manner previously described for continuous wave signals. When the band width of the grid circuit of the amplifier is less than the band width of the interfering frequency modulated signal, amplitude modulation of the interfering signal is introduced within the amplifier and the interfering signal is then suppressed as hereinbefore described, for amplitude modulated interfering signals.

Fig. 4 is a circuit diagram of another embodiment of the invention. The cathode 40 of tube 31 is connected to ground through a unilateral conductor, such as diode 72, and a resistor 71. Resistor 71 also conducts the space current of tube 61 which functions as a plate detector and amplifier. The resistance 71 is made large relative to the internal resistance of the diode 72. The cathode 40 of tube 31 is connected to ground through a condenser 43. The cathode 49 of tube 61 is by-passed to ground through a capacitance 73 much less than the capacitance of condenser 43. Under all conditions, the bias voltage applied to the control grid 34 of tube 31 is equal to the potential across condenser 43. The quiescent bias applied to control grid 34 is substantially equal to the voltage drop across resistor 71. When a signal is received, the plate current of tube 61 increases, producing, as shown in Fig. 6, a positive increment of voltage, as at 110, at the cathode of diode 72. The diode 72 is thereby rendered non-conducting during the time interval required for the condenser 43 to charge, as at 111, and bring the plate of the diode 72 to the same potential as the cathode. Thus, the incremental bias due to a signal progressively increases, as at 113, at a rate determined by the time constant of the combination of condenser 43 and the plate resistance of tube 31. This produces a degenerative effect, as at 112, on the signal at the plate of tube 31. Upon termination of a received signal, condenser 43 discharges, as at 114, through the diode 72 and resistor 71, thereby removing the incremental bias, as at 115, from the control grid 34. It is contemplated that resistor 71 has a resistance less than the plate resistance of tube 31 so that the incremental bias decays at a more rapid rate than the rate of rise. Thus, the amplifier does not remain blocked for an appreciable time after the termination of a received signal. The diode 72 thereby effects different time constants governing the rates of rise and decay of the incremental bias.

Figure 5:
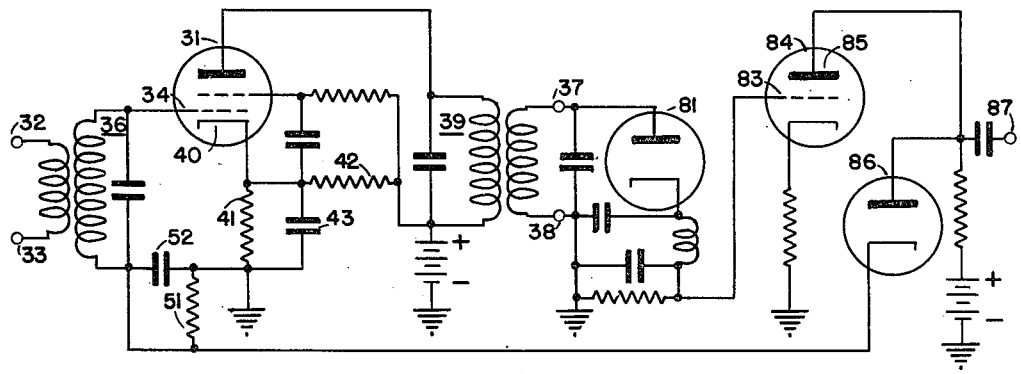

Referring now to Fig. 5, there is shown another exemplary embodiment of the invention. Tube 31 constitutes a portion of the intermediate frequency amplifier 18. The output terminals 37, 38 are connected to detector 19 comprising diode 81. The output signal of the detector diode 81, as at 120, Fig. 7, is conducted directly to the control grid 83 of tube 84 which constitutes a portion of the signal amplifier 20. The plate 85 of tube 84 is connected through a unilateral conductor, such as diode 86, to the control grid circuit of tube 31. The operation of the circuit shown in Fig. 5 is similar to that of Fig. 2, with the exception that the incremental bias is derived at a higher level of amplification. As the detected signal 120 reached grid 83, tube 84 conducts, shutting off space current through diode 86 by dropping its plate voltage, as at 121. Capacitor 52 then discharges, as in Fig. 2, and negative bias at grid 34 is increased accordingly as at 122. Diode 86 effects rapid decrease, as at 123, of the bias at tube 31 to the normal value upon termination of a received signal by conducting charging current to condenser 52.

While I have described herein the principles of my invention, it is to be clearly understood that this description is made only by way of illustration and not as a limitation on the scope of my invention as set forth in the appended claims.

The invention described herein may be manufactured and used by or for the Government of the United States of America for governmental purposes without the payment of any royalties thereon or therefor.

What is claimed is:

1. An echo ranging system comprising means for receiving an echo signal consisting of a wave train, amplifier means for the received signal, said amplifier means comprising an electron tube having at least an anode, a cathode and a control element, means for applying a negative bias voltage to the control element with respect to the cathode, means for superimposing the signal on the bias voltage, means for deriving from the signal output of the amplifier a uni-directional voltage substantially equal to the peak amplitude of the signal, a delay circuit having a time constant of the order of the echo signal duration, means for transmitting the uni-directional voltage through the delay circuit to progressively increase the bias voltage in a negative direction, and means for reducing the time constant of the delay network upon termination of the echo signal.

2. Means for distinguishing the initial portion of a pulse signal from simultaneously received interference signals comprising an amplifier for said signals, a gain control for said amplifier, means deriving from the output of said amplifier a control voltage, said means deriving said control voltage at a rate independent of the size of said amplifier output, means applying said control voltage to said amplifier gain control for reducing the gain of said amplifier, delay means limiting the application of said control voltage to a rate such that the initial portion of a received pulse signal will be fully amplified in said amplifier and subsequent portions of said received signal will be substantially attenuated, and means responsive to the termination of said received signals for removing said control voltage from said amplifier gain control at a rate much faster than it is applied.

3. In a signal apparatus, means for receiving a signal, an electron tube having at least an anode, a control element, and a cathode, a unilateral impedance element having a first terminal and a second terminal, a ground terminal, a capacitor connecting said first terminal to the ground terminal, said capacitor forming with the anode impedance of said electron tube a circuit having a first time constant, a second impedance connecting said second terminal to the ground terminal, said capacitor and said second impedance forming a circuit having a second time constant, said first time constant having a value greater than said second time constant, means for applying said signal to said control element, an output circuit connected to said anode, means deriving from said output circuit a unilateral voltage substantially equal to the peak amplitude of said signal, and means applying said unidirectional voltage to said second terminal to control the conductivity of said unilateral impedance element.

4. In a signal receiving apparatus, means for receiving a signal, an electron tube having at least anode, cathode and control grid electrodes, a unilateral impedance element having a first terminal and a second terminal, a ground terminal, means for applying a desired biasing voltage to an element of said electron tube, an impedance connecting said control grid electrode and said first terminal to the ground terminal, a capacitor connected in parallel with said impedance, said impedance and said capacitor forming with the impedance of said unilateral impedance element a first circuit having a first time constant, switching means connected to said second terminal, said switching means responsive to a control signal to disconnect said unilateral impedance element from said first circuit, said impedance and said capacitor forming a second circuit having a second time constant, said first time constant having a value greater than said second time constant, means applying said signal to said control grid electrode, an output circuit connected to said anode electrode, means for deriving said control signal from said output circuit, and means for applying said control signal to said switching means to disconnect said unilateral impedance element from said first circuit.

5. In a signal receiving apparatus, means for receiving a signal, a first electron tube having at least a first anode, a first control grid and a first cathode, a second electron tube having at least a second anode, a second control grid and a second cathode, means for applying a desired biasing voltage to an element of said first electron tube, a ground terminal, an impedance connecting said second cathode and said first control grid to the ground terminal, a capacitor connected in shunt with said impedance, said impedance, said capacitor, and the anode impedance of said second electron tube when a first bias is applied to said second electron tube forming a first circuit having a first time constant, said impedance, said capacitor and the anode impedance of said second electron tube when a second bias is applied to said second electron tube forming a circuit having a second time constant, said first time constant having a value greater than said second time constant, means for applying said first bias upon said second electron tube, means for applying said signal to said first control element, an output circuit connected to said first anode, means for deriving a control voltage from said output circuit, and means for applying said control voltage to said second electron tube to obtain said second bias on said second electron tube.

References Cited in the file of this patent

UNITED STATES PATENTS

| | | |
|---|---|---|
| 2,105,537 | Kramar | Jan. 18, 1938 |
| 2,212,110 | Beuermann | Aug. 20, 1940 |
| 2,329,570 | Wellenstein et al. | Sept. 14, 1943 |
| 2,399,968 | Whitelock | May 7, 1946 |
| 2,406,019 | Labin | Aug. 20, 1946 |
| 2,416,308 | Grieg | Feb. 25, 1947 |
| 2,445,584 | Ramo | July 20, 1948 |
| 2,449,985 | Gloess | Sept. 28, 1948 |
| 2,519,359 | Dean | Aug. 22, 1950 |
| 2,532,347 | Stodola | Dec. 5, 1950 |